United States Patent
Kurihara et al.

[15] 3,668,073
[45] June 6, 1972

[54] PREPARATION OF L-LEUCINE BY FERMENTATION

[72] Inventors: Sumio Kurihara; Kazumi Araki; Hiroyuki Ueda; Masahiko Ikumo, all of Hofu-shi, Japan

[73] Assignee: Kyowa Hakko Kogyo Kabushiki Kaisha

[22] Filed: Jan. 9, 1969

[21] Appl. No.: 790,177

[30] Foreign Application Priority Data

Jan. 11, 1968 Japan..................................43/1089

[52] U.S. Cl..................................195/29, 195/30, 195/47, 195/49
[51] Int. Cl. ..........................................C12b 1/00
[58] Field of Search ..................................195/29, 28, 30, 47

[56] References Cited

UNITED STATES PATENTS 3,133,868  5/1964  Takesue et al...........................195/30

FOREIGN PATENTS OR APPLICATIONS 1,489,909  6/1967  France

Primary Examiner—A. Louis Monacell
Assistant Examiner—Robert M. Elliott
Attorney—Bacon & Thomas

[57] ABSTRACT

L-leucine is prepared by culturing a L-leucine-producing microorganism of the genus Corynebacterium in a culture medium containing a carbon source, a nitrogen source, inorganic material, nutrients and an isoleucine, methionine, phenylalanine or valine promoter. Mixtures of the promoters may also be employed. *Corynebacterium glutamicum* ATCC 21,301 and 21,335 are particularly suitable microorganisms for use in the process. L-leucine is an essential amino acid and is useful as a nutrient additive in food and feedstuffs for human and animals, respectively.

7 Claims, No Drawings

PREPARATION OF L-LEUCINE BY FERMENTATION

BACKGROUND OF THE INVENTION

L-leucine is an essential amino acid and is useful as a nutrient additive in food and feedstuffs for humans and animals, respectively.

Prior investigators have reported that L-leucine can be obtained by using a mutant strain of *Micrococcus glutamicus* [Japanese Patent Publication No. 14,395/1963]. It was reported, however, that the mutant strain specifically requires valine for its growth and the amount of L-leucine accumulated was not reported.

Accordingly, it is an object of the invention to provide an improved process for producing L-leucine.

A further object is to provide a process for producing L-leucine which is economical in operation and suitable for commercial adaptation.

DETAILED DESCRIPTION OF THE INVENTION

We have discovered that L-leucine can be obtained by culturing a microorganism of the genus Corynebacterium in a culture medium containing a source of carbon, a source of nitrogen, inorganic substances, various other nutrients and an isoleucine, methionine, phenylalanine or valine promoter. Mixtures of the promoters may also be employed.

As described more fully in the examples, it is possible according to this invention to easily and with sufficient reproductivity accumulate L-leucine in an amount of more than about 10 mg/ml in the broth (sugar concentration: 10–20 g/dl), accordingly, the process of this invention is very useful for industrial production.

The mutant strains useful in this invention have nutrient requirements which distinguish them from strains conventionally used for industrial fermentation and from the mutant strains reported in said Japanese Pat. Publication No. 14,395/1963. Particularly particularly suitable microorganisms for use in the process according to this invention are strains which are mutants of *Corynebacterium glutamicum* (syn. *Micrococcus glutamicus* disclosed in Japanese Patent Publication No. 8698/1967). Cultures of these mutants have been deposited without restriction as to their being made available to the public in the American Type Culture Collection in which they are identified as ATCC 21,301 and 21,335. Beside these strains, other similar types of mutant strains belonging to *Corynebacterium glutamicum* have been discovered and can also be used in the practice of the invention.

ATCC 21,301 and 21,335 are obtained from the L-glutamic acid-producing strain *Corynebacterium glutamicum* KY-10108 and MF-142 respectively, by treating with N-methyl-N'-nitro-N-nitrosoguanidine.

The obtained mutant strains can be distinguished from the parent strains as follows:

When they are cultured by using minimal medium [reported in *Amino Acids and Nucleic Acids*, 8, 53, (1964)] in the presence of 100 γ/ml of isoleucine, methionine, phenylalanine, valine or mixtures thereof at 28° C. for 30 hours, their growths have the following properties (Table 1):

TABLE I

| Amino acid added | Growth (OD at 570 mμ) |
| --- | --- |
| No additive | 0.00–0.05 |
| Isoleucine | 0.11–0.15 |
| Methionine | 0.16–0.20 |
| Phenylalanine | 0.16–0.20 |
| Valine | 0.06–0.10 |
| Isoleucine and phenylalanine | >0.20 |
| Isoleucine, methionine, phenylalanine and valine | >0.20 |

It is apparent from the table that it is possible to propagate the strains in a minimal medium without addition of amino acid but with an extremely low propagation velocity. The promoter action of the amino acid additives is readily apparent. Among the said amino acids, the promoter action of phenylalanine is clearest at the earlier stage of the propagation. In other words, it is apparent that the said obtained mutant strains belong to the class of strains having the "relative requirements" to the said amino acids group.

The bacteriological properties of *Corynebacterium glutamicum* are well known in light of the report in *The Journal of General and Applied Microbiology*, Vol. 18, 279–301 (1967).

The culture medium which may be used for the purpose of this invention include any and all synthetic or natural medium containing suitable amount of carbon source, nitrogen source, inorganic substances and other nutrient.

As the carbon source in the culture medium, glucose is preferably used, but various assimilable carbon sources such as, e.g., fructose, mannose, galactose, maltose, sucrose, starch hydrolysate, molasses, glycerol, acetic acid, etc., my be used alone or in admixture.

As the nitrogen source, both organic and inorganic nitrogen compounds, such as ammonia, urea, ammonium sulfate, ammonium chloride, ammonium acetate, ammonium salts of various other organic acids, etc., may be used.

As the inorganic substances which may be included in the culture medium, there may be mentioned various salts of iron, manganese, magnesium, cobalt, zinc, nickel, chromium, etc., as well as various phosphoric acid compounds.

As the amino acids which will satisfy the specific requirements of the strains according to this invention, it is necessary to use isoleucine, methionine, phenylalanine, valine or mixtures thereof. The amount of the amino acid to be added depends upon the culturing conditions and upon the types and nature of the amino acids to be used but it is preferred to use 50 to 1,000 γ/ml of amino acid.

As the nutrients, amino acids (e.g., cystine, cysteine, glutamic acid, etc.) and vitamins (e.g., biotin, thiamin, etc.) can be added if desired. Yeast extract, Mieki (a soybean meal hydrolysate solution manufactured by Ajinomoto Co., Ltd. and available on the open market in Japan), corn steep liquor, peptone, protein hydrolysate, mat extract, hydrolysate of microbial cells, etc., can also be used as nutrient-containing materials.

L-leucine fermentation is carried out under aerobic conditions. The culturing temperature is 25° to 40° C. and preferably 27°–37° C. The pH of the medium will vary considerably but it is advantageous to adjust the pH within the range of 5.5 – 8.5 with a suitable neutralizing agent (e.g., ammonia, sodium hydroxide, potassium hydroxide, calcium hydroxide, urea etc.) during cultivation. After culturing for 3–6 days, L-leucine is accumulated, but L-tyrosine may be produced as a by-product under certain culturing conditions.

After culturing, microbial cells are removed from the broth, e.g., by filtration or centrifugation, and the filtrate is treated by a suitable method, e.g., strongly acidic cation exchange resin treatment, in order to yield L-leucine. The absorbed L-leucine is eluted, concentrated and cooled in conventional manner to yield crude crystals of L-leucine.

The following examples serve to illustrate the invention, but are not to be considered as limiting the same.

EXAMPLE 1

A culture medium was innoculated with *Corynebacterium glutamicum* ATCC 21,301, the culture medium containing peptone (1 g/dl), meat extract (1 g/dl), yeast, extract (0.5 g/dl), sodium chloride (0.3 g/dl) and glucose (2 g/dl) and having a pH of 7.0. Culturing was continued for 24 hours to obtain a seed culture.

Fermentation was carried out using a culture medium containing glucose (10 g/dl), ammonium sulfate (2 g/dl), $KH_2PO_4$ (0.15 g/dl), $K_2HPO_4$ (0.05 g/dl), $MgSO_4 \cdot 7H_2O$ (0.05 g/dl), phenylalanine (150 γ/ml), isoleucine (100 γ/ml), methionine (100 γ/ml), valine (100 γ/ml), biotin (100 γ/ml), and $CaCO_3$ (2 g/dl).

20 ml portions of the prepared medium were placed into separate 250 ml Erlenmeyer flasks and each was sterilized. The sterile culture medium in each of the flasks was innoculated with 1 ml of the seed culture, the preparation of which was described above. Fermentation was carried out at 28° C. for 5 days with shaking. An average of 9.5 mg/ml of L-leucine was accumulated in the culture medium in each flask.

One liter of material was collected from the broths and centrifuged to remove microbial cells. The filtrate was passed through a resin column packed with Dianion SK No. 1 [strongly acidic cation exchange resin available from Mitsubishi Kasei Kogyo K.K., Japan] in its H form. The resin was washed with a 0.2N aqueous solution of ammonia to elute L-leucine. The fractions containing the eluted L-leucine were combined and concentrated. After standing, there were obtained crude crystals of L-leucine (6.5 g) which were added to methanol (700 ml; 70 percent by weight). The solution was heated to dissolve the methanol and was allowed to cool on standing. The resultant precipitate was separated and washed with methanol (70 percent by weight) to yield purified L-leucine.

Analytical results obtained by the use of paper chromatography and automatic amino acid analyzer demonstrated that the L-leucine produced by the above process had similar characteristics to L-leucine produced by the conventional process. The product obtained by the above process was biologically active and was employable for the growth of strains useful for the bioassay of L-leucine. Its melting point was 298° C. (decomposed).

EXAMPLE 2

A fermentation was carried out in a manner similar to that described in Example 1, except that a medium containing glucose (12 g/dl), yeast extract (0.5 g/dl), ammonium sulfate (2 g/dl), $KH_2PO_4$ (0.15 g/dl), $K_2HPO_4$ (0.05 g/dl), $MgSO_4 \cdot 7H_2O$ (0.05 g/dl), $FeSO_4 \cdot 7H_2O$ (0.002 g/dl). $MnSO_4 \cdot 4H_2O$ (0.002 g/dl), biotin (50 γ/l) and $CaCO_3$ (2 g/dl) was used and the fermentation was carried out at 29° C. for 4 days. An average of 11.0 mg/ml of L-leucine was accumulated in the culture medium in each flask.

EXAMPLE 3

A fermentation was carried out in a manner similar to that described in Example 1, except that *Corynebacterium glutamicum* ATCC 21,335 and a medium containing $FeSO_4 \cdot 7H_2O$ (0.002 g/dl), $MnSO_4 \cdot 4H_2O$ (.002 g/dl), glucose (12 g/dl), peptone (1 g/dl), ammonium sulfate (2 g/dl), $KH_2PO_4$ (0.15 g/dl), $K_2HPO_4$ (0.05 g/dl), $MgSO_4 \cdot 7H_2O$ (0.002 g/dl), biotin (50 γ/l) and $CaCO_3$ (2 g/dl), were used. An average of 11.4 mg/ml of L-leucine was accumulated in the culture medium in each flask.

We claim:

1. A process of preparing L-leucine, consisting essentially of aerobically culturing a L-leucine-producing microorganism belonging to *Corynebacterium glutamicum* having the relative requirements to a promoter selected from the group consisting of isoleucine, methionine, phenylalanine, valine, and mixtures thereof in a culture medium containing a carbon source selected from the group consisting of glucose, fructose, mannose, galactose, maltose, sucrose, starch hydrolysate, molasses, glycerol, acetic acid and mixtures thereof, a nitrogen source, inorganic material and nutrients and a promoter selected from the group consisting of isoleucine, methionine, phenylalanine, valine and mixtures thereof and recovering the accumulated L-leucine from said culture medium.

2. A process as claimed in claim 1 in which said microorganism is *Corynebacterium glutamicum* ATCC 21,301.

3. A process as claimed in claim 1 in which said microorganism is *Corynebacterium glutamicum* ATCC 21,335.

4. A process as claimed in claim 1 in which the temperature of said culture medium is maintained within the range of 25°–40 C.

5. A process as claimed in claim 4 in which said temperature is within the range of 27°–37° C.

6. A process as claimed in claim 1 in which the pH of said culture medium is maintained within the range of 5.5–8.5.

7. A process as claimed in claim 1 in which culturing is continued for a period within the range of 3–6 days.

* * * * *